UNITED STATES PATENT OFFICE.

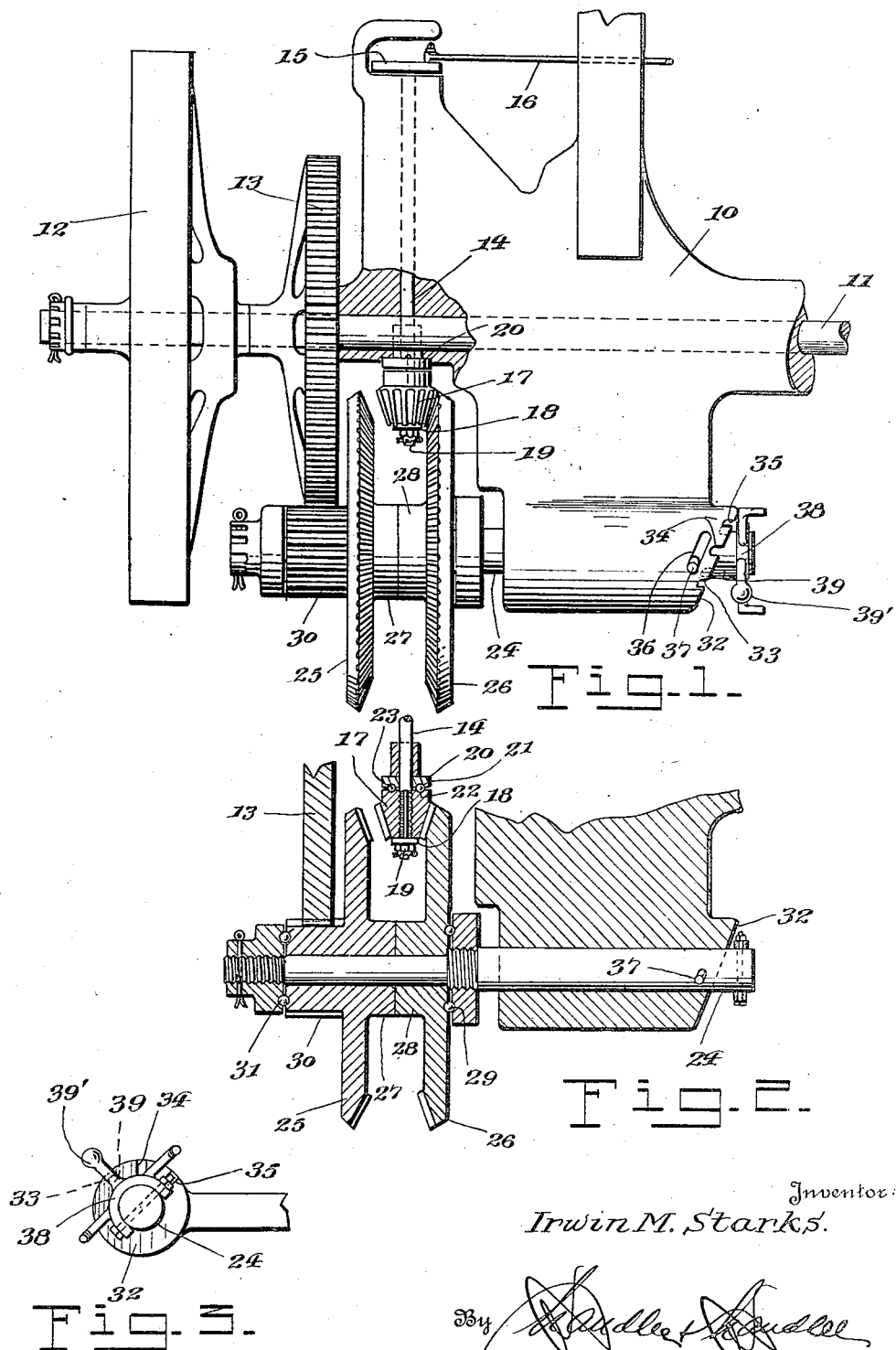

IRWIN M. STARKS, OF CALGARY, ALBERTA, CANADA.

DOUBLE-ACTION MOWING MACHINE.

1,410,617.  Specification of Letters Patent.  Patented Mar. 28, 1922.

Application filed February 25, 1921. Serial No. 447,755.

*To all whom it may concern:*

Be it known that I, IRWIN M. STARKS, a citizen of the United States of America, residing at Calgary, in the Province of Alberta, Dominion of Canada, have invented certain new and useful Improvements in Double-Action Mowing Machines; and I do hereby declare the following to be a full, clear, and exact description of the invention, such as will enable others skilled in the art to which it appertains to make and use the same.

This invention relates to new and useful improvements in mowing machines and particularly to the gearing therefor.

The principal object of the invention is to provide a gearing by means of which the cutter can be quickly and easily driven in the reverse direction to throw out a stick, stone, or other objects which has caught between the blades of the cutter and the guard fingers.

Another object is to provide a novel means for shifting the gearing whereby the cutter will be driven forwardly, backwardly, or remain idle.

A further object is to provide such a gearing which may be readily applied to mowers now in use with only very slight modifications thereto.

Other objects and advantages will be apparent from the following description when taken in connection with the accompanying drawings.

In the drawings:

Figure 1 is a top plan view of a portion of a mowing machine which is equipped with my improved gearing, and partly in section.

Figure 2 is a horizontal longitudinal sectional view through the gearing and shaft bearings.

Figure 3 is an end view of the gear shifting lever, and the notched portion of the frame.

Referring particularly to the accompanying drawing, 10 represents the frame of a mowing machine which has the axle 11 on which are mounted the ground engaging supporting wheels 12. Also mounted on the axle, adjacent one of the ground wheels 12, is a large gear 13. Extending fore and aft of the frame, and properly supported for rotation therein, is a shaft 14 having on its forward end a crank disk 15 to which is connected the cutter driving pitman 16.

Screwed on the inner end of the shaft 14 is a bevel gear 17, the said gear being retained on the shaft by means of the washer and cotter pin held nut 18 and 19 respectively. At the inner end of the gear, on the shaft 14, there is mounted a disk 20 having a ball race 21 in one face for cooperation with a similar ball race 22, formed in the adjacent face of the gear, to receive the bearing balls 23.

Mounted in the rear portion of the frame, and extending transversely thereof, is a shaft 24, having loosely rotatable thereon a pair of bevel gears 25 and 26, each having a hub, as shown at 27 and 28, respectively, which are secured together for simultaneous rotation and which hold the gears in spaced facing position. Between these gears 25 and 26, the first bevel gear 17 is disposed and arranged to be engaged alternately with one or the other of the gears 25 and 26 by a means which will later be described. Ball bearings 29 are arranged at the outer face of the gear 26. The gear 25 has an integral toothed portion extending from the center of its outer face, and meshing with this portion, which portion is designated by the numeral 30, is the before-mentioned large gear 13, said gear 13 being driven by the axle 11. Ball bearings 31 are arranged on the end of the shaft 24, at a point outwardly of the gear 13.

The side edge portion of the frame of the mower, remote from the gears 25 and 26, is formed with an inclined face 32, and in said face are formed the three equally spaced notches 33, 34, and 35. In the upper face of said end of the frame, and in parallel relation to the face 32, is a slot 36 in which rides a pin 37, carried by and projecting from the face of the adjacent end of the shaft 24. It will, of course, be understood that the shaft 24 remains stationary while the gears 25 and 26 rotate thereon. Pivotally carried by the last-named end of the shaft 24 is a member 38 on which is formed a projection 39 arranged to enter one or another of the notches 33, 34, and 35, when the member and shaft are partially rotated. This member is formed with a radially extending arm 39′ which is connected with a suitable hand lever 40, operable by the driver from his seat. It will be seen that when the shaft 24 is turned until the projection 39 is within the first notch 33, the pin 37, by contact with the walls of the slot 36, will cause the shaft to move longitudinally, bringing the gear 26 into mesh with the gear 17, with the result that the shaft 14 will rotate in a direction to reciprocate the cutter pitman and drive the cutter in the reverse direction. When the projection 39 enters the central notch 34, the gear 17 will be disposed at a point intermediate the gears 25 and 26, and out of mesh with both, thus rendering the cutter idle. When the projection is within the third notch 35, the gear 17 is in mesh with the gear 25 thus driving the cutter in a forward direction. With this construction, should a stick or stone catch in the cutter, the driver simply moves the member 38 until the projection 39 enters the notch 33, when the gear 17 will be in mesh with the gear 26, and the cutter reciprocated in the reverse direction, thus throwing out the stick or stone.

Thus the driver does not have to stop the mower and get down on the ground to remove the obstacle by hand, or manipulate the gearing by hand to separate the cutter blade from the guard fingers. By the simple operation of the lever 40, the driver can change the direction of travel of the cutter, or stop the motion thereof, without leaving his seat. The reverse rotation of the gearing will cause the cutter to automatically throw out the obstacle.

What is claimed is:

A gearing for a mowing machine comprising a cutter driving element including a gear, a shaft shiftable rotatably and longitudinally, a pair of gears loosely rotatable on the shaft and disposed on opposite sides of the first-named gear, a support for the shaft, said support having a slot extending obliquely across the shaft, a pin carried by the shaft movable in said slot to produce rotary and longitudinal movement of the shaft, said support having a beveled face formed with a plurality of notches, and a means on the end of the shaft for moving the shaft and provided with a projection for engagement successively in the notches to hold the shaft in its different adjusted positions with the second named gears in the successive positions of alternate engagement with the driving element gear and out of engagement with said gear.

In testimony whereof, I affix my signature, in the presence of two witnesses.

IRWIN M. STARKS.

Witnesses:
H. R. CHANDLEE,
M. H. ROBINSON.